United States Patent [19]
Robbins, III et al.

[11] Patent Number: 5,671,875
[45] Date of Patent: Sep. 30, 1997

[54] MEASURING/DISPENSING CLOSURE FLIP-TOP CAP AND BUILT IN SHUT-OFF BLADE

[75] Inventors: Edward S. Robbins, III, 2802 E. Avalon Ave., Muscle Shoals, Ala. 35661; Gregory S. Burcham, Spruce Pine, Ala.

[73] Assignee: Edward S. Robbins, III, Muscle Shoals, Ala.

[21] Appl. No.: 677,350

[22] Filed: Jul. 2, 1996

[51] Int. Cl.⁶ .................................................. G01F 11/26
[52] U.S. Cl. ............................................ 222/452; 222/456
[58] Field of Search ............................... 222/452, 454, 222/456, 476

[56] References Cited

U.S. PATENT DOCUMENTS

| | | |
|---|---|---|
| D. 323,781 | 2/1992 | Hamly et al. . |
| D. 350,877 | 9/1994 | Van Walkenburg et al. . |
| 1,273,012 | 7/1918 | Souther . |
| 1,714,368 | 5/1929 | Hobson . |
| 1,802,284 | 4/1931 | Stoddard . |
| 2,214,437 | 9/1940 | Punte et al. . |
| 2,339,644 | 1/1944 | Lucas . |
| 2,370,820 | 3/1945 | Stott . |
| 2,449,285 | 9/1948 | Ekstrom . |
| 2,784,884 | 3/1957 | Borie, Jr. . |
| 2,804,103 | 8/1957 | Wall . |
| 2,811,281 | 10/1957 | Donovan . |
| 2,840,124 | 6/1958 | Greene . |
| 2,844,266 | 7/1958 | Hofe . |
| 2,969,167 | 1/1961 | Libit . |
| 2,985,343 | 5/1961 | Mask . |
| 3,020,659 | 2/1962 | Paulini . |
| 3,033,420 | 5/1962 | Thomas et al. . |
| 3,140,799 | 7/1964 | Mehr . |
| 3,168,223 | 2/1965 | Capers . |
| 3,424,355 | 1/1969 | Blumen . |
| 3,486,665 | 12/1969 | La Croce . |
| 3,860,111 | 1/1975 | Thompson . |
| 3,948,105 | 4/1976 | Johnson, Jr. . |
| 4,069,935 | 1/1978 | Hampel . |
| 4,079,859 | 3/1978 | Jennings . |
| 4,083,467 | 4/1978 | Mullins et al. . |
| 4,102,477 | 7/1978 | Yoon ................................. 222/452 X |

(List continued on next page.)

*Primary Examiner*—Gregory L. Huson
*Attorney, Agent, or Firm*—Nixon & Vanderhye P.C.

[57] ABSTRACT

A measuring dispensing closure for a container includes a hollow body having an opening therein, and a pivotable flip top. The flip top is mounted on the body for pivotal motion about a horizontal hinge axis between closed and open positions. The hollow body has an internal, part spherical weir panel located below the opening, with an edge extending parallel with the hinge axis thus establishing a weir opening between the weir edge and a peripheral portion of the opening, and defining, in cooperation with an underside portion of the flip top and a remaining peripheral portion of the opening, a measuring chamber within the closure. The flip top is also formed with a shut-off blade adapted to engage the weir edge when the flip top is in the open position.

9 Claims, 3 Drawing Sheets

U.S. PATENT DOCUMENTS

| | | |
|---|---|---|
| 4,144,989 | 3/1979 | Joy . |
| 4,164,301 | 8/1979 | Thayer . |
| 4,209,100 | 6/1980 | Uhlig . |
| 4,292,846 | 10/1981 | Barnett . |
| 4,298,038 | 11/1981 | Jennings . |
| 4,318,500 | 3/1982 | Melikian . |
| 4,346,823 | 8/1982 | Eppenbach . |
| 4,376,497 | 3/1983 | Mumford . |
| 4,399,928 | 8/1983 | Klingler . |
| 4,408,703 | 10/1983 | Libit . |
| 4,544,063 | 10/1985 | Neward . |
| 4,580,687 | 4/1986 | Lewis . |
| 4,606,481 | 8/1986 | Conti et al. . |
| 4,610,371 | 9/1986 | Karkiewicz . |
| 4,613,057 | 9/1986 | Sacchetti et al. . |
| 4,635,828 | 1/1987 | Kaufman . |
| 4,637,529 | 1/1987 | Knight ................................ 222/452 |
| 4,643,881 | 2/1987 | Alexander et al. . |
| 4,646,948 | 3/1987 | Jennings et al. . |
| 4,691,821 | 9/1987 | Hofmann . |
| 4,693,399 | 9/1987 | Hickman et al. . |
| 4,714,181 | 12/1987 | Kozlowski et al. . |
| 4,723,693 | 2/1988 | DeCoster . |
| 4,802,597 | 2/1989 | Dubach . |
| 4,898,292 | 2/1990 | VerWeyst et al. . |
| 4,930,688 | 6/1990 | Arona-Delonghi . |
| 4,936,494 | 6/1990 | Weidman . |
| 4,955,513 | 9/1990 | Bennett . |
| 4,961,521 | 10/1990 | Eckman . |
| 5,011,048 | 4/1991 | Mark . |
| 5,064,106 | 11/1991 | Butler et al. . |
| 5,085,331 | 2/1992 | Groya et al. . |
| 5,139,181 | 8/1992 | VerWeyst et al. . |
| 5,411,186 | 5/1995 | Robbins, III . |
| 5,465,871 | 11/1995 | Robbins, III . |
| 5,487,494 | 1/1996 | Robbins . |
| 5,489,049 | 2/1996 | Robbins, III . |
| 5,509,582 | 4/1996 | Robbins, III . |
| 5,518,152 | 5/1996 | Burcham et al. ................... 222/452 |

MEASURING/DISPENSING CLOSURE FLIP-TOP CAP AND BUILT IN SHUT-OFF BLADE

RELATED APPLICATIONS

This application is generally related to the subject matter of commonly owned co-pending application Ser. No. 08/557,559 filed Nov. 14, 1995.

BACKGROUND AND SUMMARY OF THE INVENTION

The present invention relates generally to dispensing containers and more specifically, to dispensing cap constructions enabling accurately measured mounts of container contents (in granular, particulate, powdered or liquid form) to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

The present invention eliminates the need for measuring spoons or cups by providing a closure, which serves as its own measuring device, for use with an otherwise conventional container. While the incorporation of a measuring function into a container/closure construction for the discharge of desired amounts of the container contents is not new (see for example, U.S. Pat. Nos. 1,802,284; 2,804,103; 3,860,111; 4,613,057 and 4,635,828), the present invention provides an improved and simplified structure for accomplishing this result.

More recently, improved dispensing type measuring caps or closures have been disclosed in commonly owned U.S. patent application Ser. No. 08/288,896 filed Aug. 10, 1994 and in commonly owned U.S. Pat. No. 5,465,871. Application Ser. No. is 08/557,559 mentioned above discloses further iterations of dispensing type measuring caps or closures which incorporate flat, rectangular pivot type dispensing doors or panels in combination with internal measuring chambers including weir dams or panels. One embodiment includes a chamber closing Range, operable when the dispensing door or panel is open, to prevent excess material from being transferred into the measuring chamber.

In accordance with this invention, a further improved measuring/dispensing closure is provided which incorporates a flip top cap and a built-in shut-off-blade. In the exemplary embodiment, a plastic measuring/dispensing closure includes a pivotable flip top which is seated on a dome-like upper portion of a peripheral skirt. The dome-like portion tapers upwardly and inwardly to a round opening defined by an upstanding annular rim, and the flip top is arranged to seal the opening in a closed position, and to permit dispensing of measured mounts of contents through the opening when in the closed position.

Located within the dispensing opening, there is an inverted, dome-shaped chamber wall, or weir dam panel, formed with a horizontal chordal edge so that a weir opening is formed between the chordal edge and the peripheral surface of the dispensing opening.

It will be appreciated that with the flip top in place, a measuring chamber is formed by reason of the cooperation of the weir dam panel, the underside of the cap portion of the flip top, and the peripheral portion of the dispensing opening formed in the dome-like portion of the closure skirt.

The underside of the flip top is formed with a shut-off blade which has a curvature generally similar to that of the cap portion of the flip top. This shut-off blade extends vertically downwardly from the underside of the cap portion, and is shaped and sized to engage the edge of the weir dam panel when the flip top is moved to an open position upon the exertion of force or pressure on the press flange portion of the flip top.

With this arrangement, and with the flip top in a closed position, the user may transfer a desired amount of contents from the body of the container into the measuring chamber. After the desired amount has been transferred, the user may then open the flip top and, at the same time, cause the shut-off blade to engage the chordal edge of the weir dam panel so that the amount dispensed from the closure is exactly that amount which has been transferred into the measuring chamber. In other words, the user need not be concerned that additional contents will flow from the container into the measuring chamber when the container is lifted to facilitate dispensing contents from the measuring chamber.

Accordingly, in its broader aspects, the present invention relates to a measuring dispensing closure for a container comprising a hollow body having an opening therein, and a pivotable flip top, the flip top mounted on the body for pivotal motion about a horizontal hinge axis between closed and open positions, the hollow body having an internal, part spherical weir panel located below the opening and having an edge extending parallel with the hinge axis thus establishing a weir opening between the weir edge and a peripheral portion of the opening, and defining, in cooperation with an underside portion of the flip top and a remaining peripheral portion of the opening, a measuring chamber within the closure, and wherein the flip top is formed with a shut-off blade adapted to engage the weir edge when the flip top is in the open position.

In another aspect, the present invention relates to a container assembly which includes a container body and a closure as described above.

Objects and advantages other than those mentioned above will become apparent from the detailed description which follows.

DETAILED DESCRIPTION OF THE DRAWINGS

Figure 1:
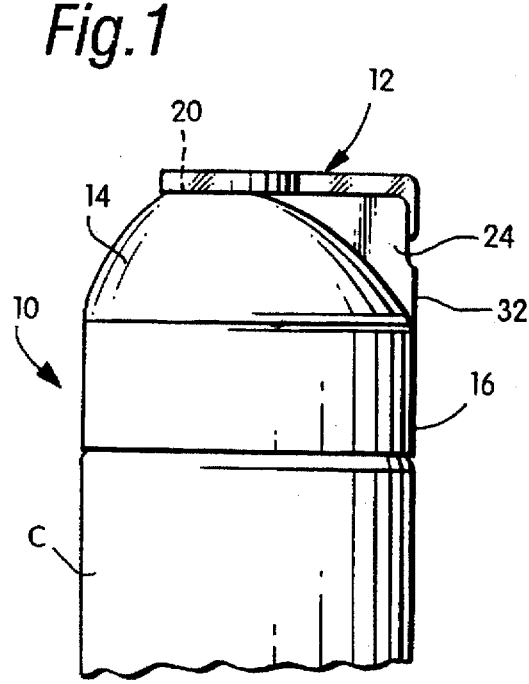
FIG. 1 is a side elevation of a measuring/dispensing closure attached to a container in accordance with an exemplary embodiment of the invention.
Figure 2:
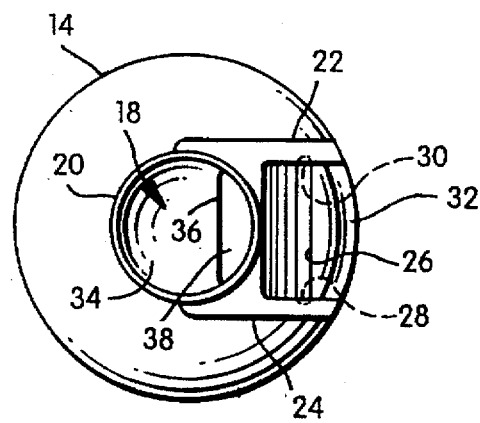
FIG. 2 is a plan view of FIG. 1, but with a flip top component of the closure removed.

With reference now to FIGS. 1 and 2, a measuring closure 10 in accordance with this invention is shown attached to an otherwise conventional container C. The closure may be attached by the illustrated screw "T" threads or any other suitable means including press fit, etc. The cap includes a pivotable flip top component 12 which sits atop a dome-like upper portion 14 of a peripheral skirt or hollow body 16. The dome-like portion 14 tapers upwardly and inwardly to a round dispensing opening 18 defined by an upstanding annular rim 20. Extending radially outwardly from the opening 18, on opposite sides thereof, are a pair of vertically oriented gussets 22 and 24 which terminate in a vertical direction just short of the upstanding rim 20. These gussets 22 and 24 combine to form a generally C-shaped recess (when viewed from above) 26 opening radially outwardly as best seen in FIG. 2. Facing sides of the gussets 22, 24 are provided with pin-shaped detents 28 and 30 which open toward each other, and which are adapted to receive pivot pins of the flip top 12 as described further below. Between the gussets 22 and 24, the cap skirt 16 is modified to include an upstanding wall 32 connecting the radially outermost, lower ends of the gussets so as to provide a recess for receiving the press portion of the cap as also described in greater detail below.

Located within the opening 18, there is an inverted dome-shaped (i.e., part spherical) chamber wall, or weir dam 34 (see also FIGS. 6, 7 and 9) formed with a horizontal (when the container is upright) chordal edge 36, leaving a weir opening 38 between the edge 36 and the peripheral surface of the opening 18, as best seen in FIG. 2. Since the edge 36 has been formed by cutting away a portion of the inverted dome-like panel, the edge describes a curve in a vertical plane, and a straight line in a horizontal plane. Note that the chamber wall or weir dam 34 curves upwardly to merge smoothly with the rim 20 at the uppermost interior edge thereof. This insures that no material will "hang up" within the chamber during the dispensing procedure discussed further below.

Figure 3:
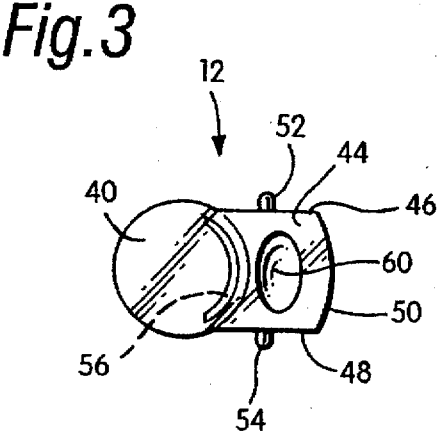
FIG. 3 is a top plan view of a flip top portion of the closure illustrated in FIG. 1.
Figure 5:
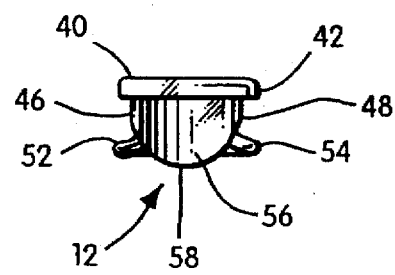
FIG. 5 is a front elevation of the flip top component.
Figure 4:
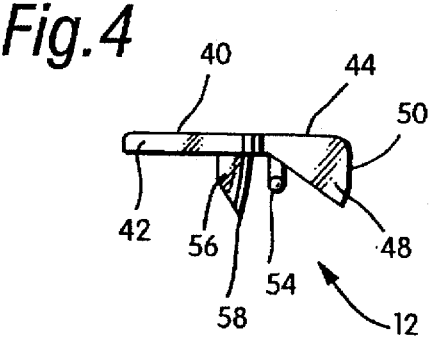
FIG. 4 is a side elevation of the flip top component.

Turning now to FIGS. 3, 4 and 5, the pivotable flip top 12 includes a circular cap portion 40 having a peripheral depending flange 42, the circular cap portion 40 corresponding in size to the opening 18, such that the peripheral flange 40 fits over and about the vertical upstanding rim 22 when the cap is in a closed position. Preferably, an airtight seal is obtained. The flip top 12 also includes a flat, press flange 44 extending radially away from the cap portion 38. The press flange 44 includes a pair of generally triangular-shaped reinforcing gussets 46, 48 which extend downwardly from the press flange 42 as best seen in FIG. 4, and which are connected by a peripheral portion 50 which lies on substantially the same radius or diameter as the skirt portion 14, as best seen in FIG. 1. The press flange 44 includes a pair of oppositely directed pivot pins or projections 52, 54 which are adapted to be received in the recesses 28, 30 and which enable the flip top 12 to pivot between open and closed positions.

On the underside of the flip top 12, there is a shut-off blade 56 which has a curvature when viewed in plan, generally like that of the skirt or flange 42 of the circular cap portion 40 (see FIG. 3). The blade 56 extends downwardly vertically from the underside of the circular portion 40 as best seen in FIGS. 3–5. The blade also exhibits a curved lower edge 58 in a vertical plane, as best seen in FIG. 5.

Figure 6:
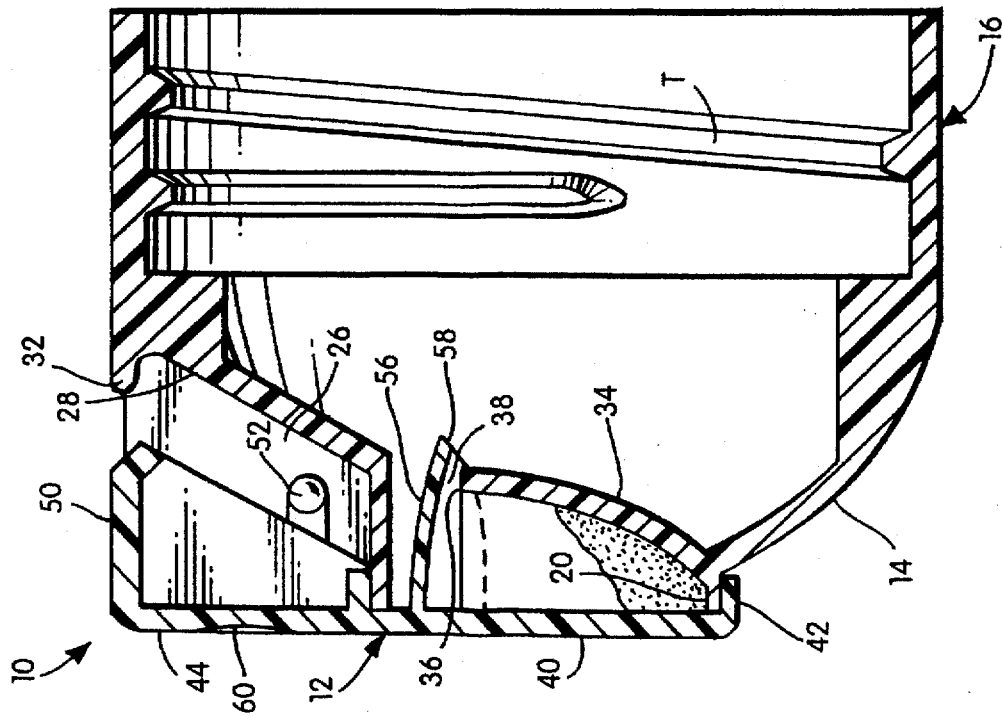
FIG. 6 is a section view of the dispensing/measuring closure in accordance with this invention, with the flip top component shown in a closed position.
Figure 8:
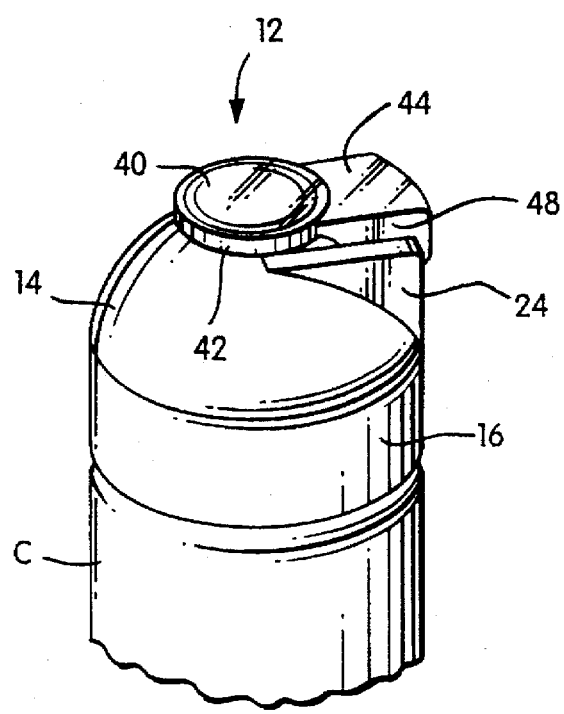
FIG. 8 is a perspective view of the dispensing/measuring closure and cap as shown in FIG. 1.

With the flip top 12 in place on the cap 10 in the closed position as shown in FIGS. 1, 6 and 8, the flange 42 snaps over the rim 22 and provides a substantially airtight seal with the dispensing opening 18. Notice that in the closed position, the shut-off blade 56 is spaced away from the edge 36 of the weir dam panel 34 so that when the flip top 12 is in its closed position, contents of the container can be poured through the weir opening 38 and into a measuring chamber defined by the weir dam panel 34, the underside of the cap portion 38 of the flip top 12, and that part of the rim 20 which is commensurate with the weir dam panel 34.

Figure 7:
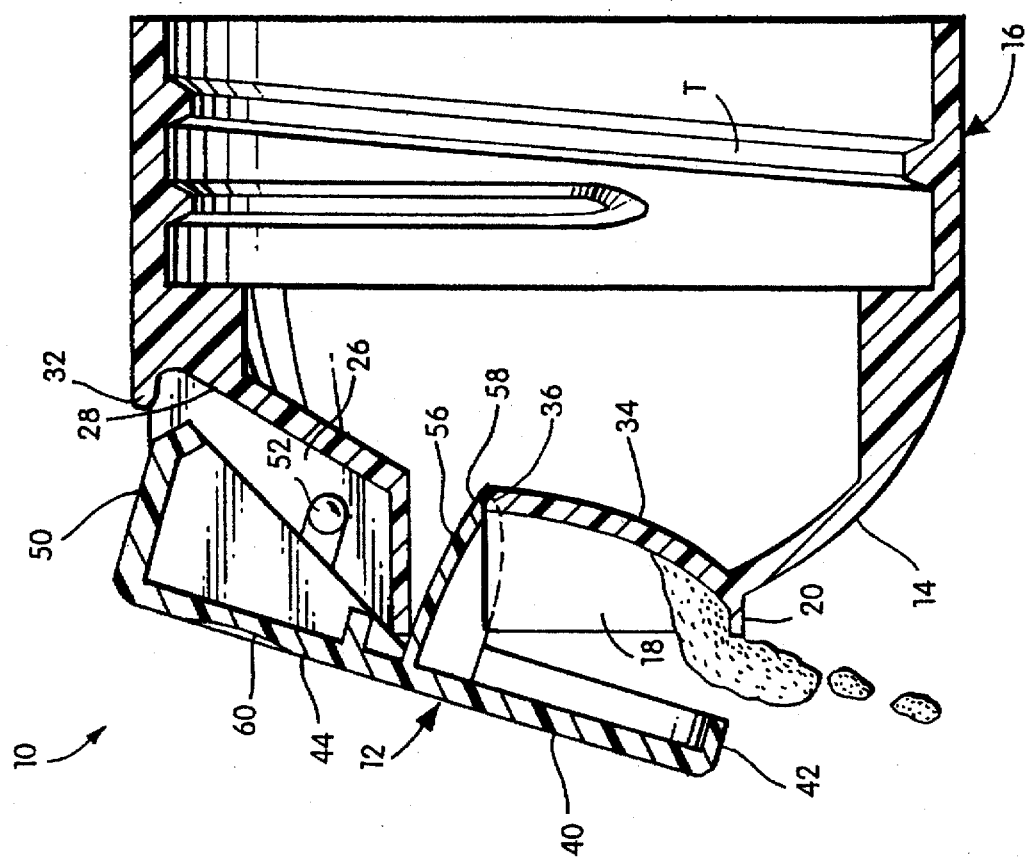
FIG. 7 is a sectional view similar to FIG. 6 but with the flip top component shown in an open position.
Figure 9:
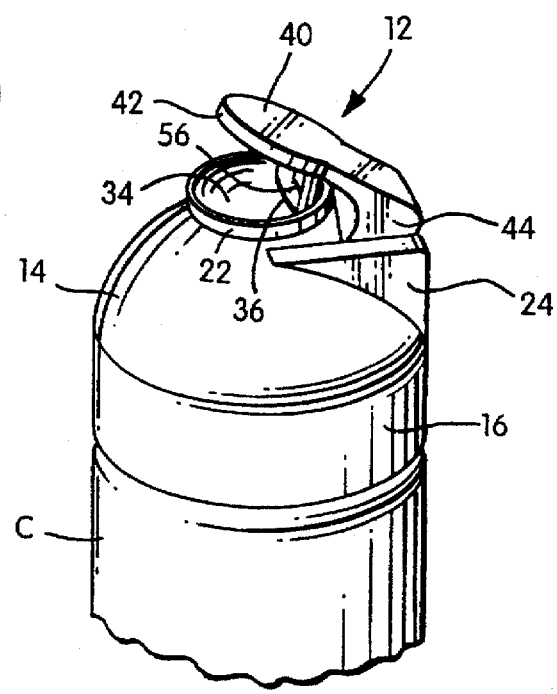
FIG. 9 is a perspective view similar to FIG. 8 but illustrating the flip top component in an open position.

Now, when the press flange 42 of the flip top to the rear of the pivot pins 50, 52 is pushed downwardly (or clockwise in FIG. 7), the cap portion 40 of the flip top 12 will pivot about the pins 50 and 52, and disengage from the rim 20, moving to the open position shown in FIGS. 7 and 9. In the open position, the curved edge 58 of the blade 56 engages the edge 36 of the weir dam 34 and seals shut the weir opening 38. At the same time, the predetermined amount of contents within the measuring chamber are able to flow out of the chamber via the dispensing opening 18 as shown in FIG. 7, but without additional container contents flowing through the weir opening 38, now closed by the blade 54. To facilitate the pivoting movement of the flip top, a press "button" or recess 60 may be provided in the press flange.

In the preferred embodiment, the flip top component 12 (and the body 16, if desired) is made of clear transparent plastic material so that the user is able to determine the presence or absence of contents within the measuring chamber, and also to adjust the amount of contents in that chamber by either adding material through the weir opening 38, or by shaking some of the material back into the container through the same weir opening. In this way, the user is sure to dispense only a predetermined amount of contents from the closure. It should be understood that the size of the measuring chamber can be varied for particular applications. For example, for contents such as sweeteners which are typically packaged in small paper packets, the chamber can be sized to hold the equivalent of one packet, when the transferred contents reach the level of the chordal edge 36, with the container tilted sideways as shown in FIG. 6.

When the flip top 12 is returned to its closed position, the user is free to fill the measuring chamber again with a predetermined amount of material and to dispense it in the same manner as described above. This construction is particularly advantageous for dispensing predetermined amounts of container contents on a regular and repeatable basis, such as the sweetener application mentioned above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing closure for a container comprising a hollow body having an opening therein, and a pivotable flip top, said flip top mounted on the body for pivotal motion about a horizontal hinge axis between closed and open positions, said flip top having a first planar cap portion sized and adapted to cover said opening, and second press portion adapted to be pressed by a user to move said flip top from said closed to said open position; said hollow body having an internal, curved weir panel located below said opening and having an edge extending parallel with said hinge axis thus establishing a weir opening adjacent said weir edge, said weir panel defining, in cooperation with an underside portion of said flip top and a peripheral portion of said opening, a measuring chamber within said closure, and wherein said flip top is formed with a shut-off blade extending downwardly from and substantially perpendicularly to said planar cap portion, said shut-off blade movable into engagement with said weir edge when said flip top is in said open position.

2. The measuring dispensing closure of claim 1 wherein at least said flip top is constructed of substantially transparent plastic.

3. The measuring dispensing closure of claim 1 wherein said internal weir panel is shaped substantially as an inverted dome, extending more than 180° about the periphery of said opening.

4. The measuring dispensing closure of claim 1 wherein said weir panel edge and said hinge axis are laterally offset from each other.

5. The measuring dispensing closure of claim 1 wherein cooperating surface means are provided for establishing a substantially airtight seal between a cap portion of said flip top and an upstanding rim surrounding said opening.

6. The measuring dispensing closure of claim 1 wherein said shut-off blade is curved in two dimensions.

7. The measuring dispensing closure of claim 6 wherein said weir edge is straight in one dimension and curved in a second dimension.

8. The measuring dispensing closure of claim 1 wherein said flip top is mounted between a pair of substantially vertical gussets extending radially away from said opening.

9. A container assembly including a container body and a measuring dispensing closure secured to the container body, the closure comprising a hollow body having an opening therein, and a pivotable flip top, said flip top mounted on the body for pivotal motion about a horizontal hinge axis between closed and open positions, said flip top having a first planar cap portion sized and adapted to cover said opening, and second press portion adapted to be pressed by a user to move said flip top from said closed to said open position; said hollow body having an internal, curved weir panel located below said opening and having an edge extending parallel with said hinge axis thus establishing a weir opening adjacent said weir edge, said weir panel defining, in cooperation with an underside portion of said flip top and a peripheral portion of said opening, a measuring chamber within said closure, and wherein said flip top is formed with a shut-off blade extending downwardly from and substantially perpendicularly to said planar cap portion, said shut-off blade movable into engagement with said weir edge when said flip top is in said open position.

* * * * *